United States Patent
Kwan et al.

(10) Patent No.: US 12,533,305 B2
(45) Date of Patent: Jan. 27, 2026

(54) NATURALLY DERIVED SURFACTANT SYSTEM WITH POLYGLYCEROL ESTERS AND COMPOSITIONS COMPRISING THE SAME

(71) Applicant: Conopco, Inc., Englewood Cliffs, NJ (US)

(72) Inventors: Thomas Alan Kwan, Sudbury, MA (US); Jennifer Hyeeun Kwon, Naperville, IL (US); Teanoosh Moaddel, Watertown, CT (US); Mingjun Yuan, Woodbridge, CT (US); David Waters, Seymour, CT (US)

(73) Assignee: Conopco, Inc., Hoboken, NJ (US)

( * ) Notice: Subject to any disclaimer, the term of this patent is extended or adjusted under 35 U.S.C. 154(b) by 494 days.

(21) Appl. No.: 18/007,610

(22) PCT Filed: Jun. 2, 2021

(86) PCT No.: PCT/EP2021/064839
§ 371 (c)(1),
(2) Date: Dec. 1, 2022

(87) PCT Pub. No.: WO2021/245160
PCT Pub. Date: Dec. 9, 2021

(65) Prior Publication Data
US 2023/0263717 A1 Aug. 24, 2023

(30) Foreign Application Priority Data
Jun. 4, 2020 (EP) .................... 20178376

(51) Int. Cl.
*C11D 1/00* (2006.01)
*A61K 8/00* (2006.01)
*A61K 8/39* (2006.01)
*A61K 8/44* (2006.01)
*A61Q 19/10* (2006.01)

(52) U.S. Cl.
CPC ............... *A61K 8/39* (2013.01); *A61K 8/44* (2013.01); *A61Q 19/10* (2013.01); *A61K 2800/262* (2013.01); *A61K 2800/5422* (2013.01); *A61K 2800/5424* (2013.01); *A61K 2800/596* (2013.01)

(58) Field of Classification Search
None
See application file for complete search history.

(56) References Cited

U.S. PATENT DOCUMENTS

| | | | |
|---|---|---|---|
| 2011/0152148 A1 | 6/2011 | Kunieda et al. | |
| 2012/0157366 A1* | 6/2012 | Anim-Danso | A61Q 19/10 510/130 |
| 2015/0141466 A1 | 5/2015 | Klug et al. | |
| 2016/0074310 A1 | 3/2016 | Klug et al. | |
| 2017/0071846 A1 | 3/2017 | Schelges et al. | |
| 2019/0105244 A1* | 4/2019 | Song | A61K 8/817 |
| 2019/0125650 A1 | 5/2019 | Lee et al. | |
| 2019/0224099 A1 | 7/2019 | Gauczinski et al. | |
| 2020/0046623 A1 | 2/2020 | Segawa | |

FOREIGN PATENT DOCUMENTS

| | | |
|---|---|---|
| CN | 107638362 | 9/2017 |
| CN | 109106608 | 1/2019 |
| CN | 105213261 | 10/2020 |
| JP | 408231381 | 9/1996 |
| WO | WO2017216162 | 12/2017 |
| WO | WO2018221420 | 12/2018 |
| WO | WO2019036591 | 2/2019 |

OTHER PUBLICATIONS

Search Report and Written Opinion in EP20178376.8; Nov. 5, 2020.
Kenneth Mason; The use of NatraGem Natureal Fragrance Solubiliser (NNFS) in Personal Care Formulations; ISSN: 0374-4353; Feb. 1, 2014; Research Disclosure Publ. Hampshire, UK.
Nnanna Ifendu A et al; Protein-based surfactants; Potential applications of protein-based surfactants; Jan. 1, 2001; p. 227/232 paragraph 1.
Anonymous; Purify Botanic Wash for Sensitive & Normal skin; XP55741498; Apr. 23, 2019; 1,4; Database GNPD Mintel.
Qinghai Younike Biotechnology Co Ltd; XP2800797; Thomas Scientific London GB; Jan. 6, 2016; abstract; week 201635.
Search Report and Written Opinion in EP20178377; Nov. 23, 2020.
Search Report & Written Opinion in PCT/EP2021/064838;Aug. 9, 2021.
Fissan Piccolo Mio Bagnetto Delicato (My Baby Delicate Bath), Italy, Unilever, Mintel; Nov. 2018.
Zwitsal Naturals Bath and Wash Cream, Belgium, Unilever, Mintel; Aug. 2018.

* cited by examiner

*Primary Examiner* — Necholus Ogden, Jr.
(74) *Attorney, Agent, or Firm* — Edward A. Squillante, Jr.

(57) ABSTRACT

The present invention is directed to a naturally derived surfactant system and an end use composition comprising the surfactant system. The naturally derived surfactant system comprises an anionic and nonionic surfactant comprising polyglycerol ester that is stable in an end use composition having a pH from 4.8 to 6.5. Such end use compositions are mild, have excellent lathering characteristics, and do not require glycinates, polyglycosides, betaines, sultaines and sulfates.

19 Claims, No Drawings

NATURALLY DERIVED SURFACTANT SYSTEM WITH POLYGLYCEROL ESTERS AND COMPOSITIONS COMPRISING THE SAME

FIELD OF THE INVENTION

The present invention is directed to a naturally derived surfactant system and an end use composition comprising the same. More particularly, the naturally derived surfactant system comprises an anionic and nonionic surfactant that surprisingly are stable in an end use composition having a pH from 4.8 to 6.5. Such compositions are mild, have excellent lathering characteristics, and do not require glycinates, polyglycosides, betaines, sultaines and sulfates.

BACKGROUND OF THE INVENTION

Surfactants are used in many consumer products, including cosmetics, shampoos and home care compositions. Traditionally, many are synthesized from petroleum derivatives.

Save for water, surfactants are one of the most abundant ingredients in personal care compositions, especially wash compositions. The use of surfactants in personal care compositions often results in benefit delivery to most consumers. Unfortunately, however, since compositions with surfactants are at some point washed off the body, surfactants regularly find their way into the environment as they are carried in waste water. As waste water often terminates on land and in waterways, surfactants are deposited or delivered to soil and bodies of water, leading to conditions that can be detrimental to plants, ecosystems, animals and even humans. Another issue concerning compositions with surfactants is they may be harsh on skin since they often can be difficult to formulate at a pH that is close to the natural pH of skin.

It is of increasing interest to develop compositions with surfactants that are less harsh not only to the environment but also to the consumer. Particularly, there is a need to develop compositions having surfactants that are biodegradable, less toxic and suitable to be formulated in a composition having a pH that is close to the natural pH of skin. The present invention, therefore, is directed to a naturally derived surfactant system and an end use composition comprising the same. The naturally derived surfactant system comprises an anionic and nonionic surfactant that surprisingly are stable in an end use composition having a pH from 4.8 to 6.5 and result in excellent lathering characteristics. Such compositions are mild, substantially free of polyglycosides, betaines, sultaines and sulfates, and are gentle enough for use on the most fragile consumers, babies.

Additional Information

Efforts have been disclosed for making cleaning compositions. In U.S. Patent Application Publication No. 2016074310A, compositions with N-methyl-N-acylglucamine and N-acyl-amino acid surfactant are described.

Other efforts have been disclosed for making cleaning compositions. In U.S. Patent Application No. 2019125650, hair care compositions with carboxylate anionic surfactants are described.

Even other efforts have been disclosed for making cleaning compositions. In U.S. Pat. No. 5,951,991, dry, disposable, personal cleansing products having an insoluble substrate and lathering surfactant are described.

None of the additional information describes a naturally derived surfactant system and end use composition comprising the same as described and claimed herein.

SUMMARY OF THE INVENTION

In a first aspect, the present invention is directed to a surfactant system comprising:
a) an anionic dicarboxylate (surfactant) comprising a glutamate, aspartate or both;
b) a nonionic comprising a polyglycerol ester (surfactant); and
c) optionally water wherein the surfactant system is suitable for use in an end use composition that has a pH from 4.8 to 6.5, the anionic dicarboxylate and nonionic comprising a polyglycerol ester are at a weight ratio from 5:1 to 1:5 and make up from 80 to 100% by weight total surfactant in the surfactant system.

In a second aspect, the present invention is directed to a surfactant system comprising:
a) an anionic dicarboxylate comprising a glutamate, aspartate or both, the glutamate and/or aspartate having a formula:

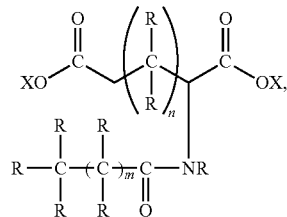

and
b) a nonionic comprising at least one polyglycerol ester which comprises polyglycerol-3 caprylate, polyglycerol-3 caprate, polyglycerol-3 laurate, polyglycerol-3 myristate, polyglycerol-3 palmitate, polyglycerol-3 stearate, polyglycerol-3 oleate, polyglycerol-3 cocoate, polyglycerol-5 caprylate, polyglycerol-5 caprate, polyglycerol-5 laurate, polyglycerol-5 myristate, polyglycerol-5 palmitate, polyglycerol-5 stearate, polyglycerol-5 oleate, polyglycerol-5 cocoate, polyglyceryl-8 caprylate, polyglycerol-8 caprate, polyglyceryl-8 laurate, polyglyceryl-8 myristate, polyglyceryl-8 palmitate, polyglycerol-8 stearate, polyglycerol-8 oleate, polyglyceryl-8 cocoate, polyglyceryl-9 caprylate, polyglycerol-9 caprate, polyglyceryl-9 laurate, polyglyceryl-9 myristate, polyglyceryl-9 palmitate, polyglycerol-9 stearate, polyglycerol-9 oleate, polyglyceryl-9 cocoate, polyglycerol-10 caprylate, polyglycerol-10 caprate, polyglycerol-10 laurate, polyglycerol-10 myristate, polyglycerol-10 palmitate, polyglycerol-10 stearate, polyglycerol-10 oleate, polyglyceryl-10 cocoate, polyglycerol-11 caprylate, polyglycerol-11 caprate, polyglycerol-11 laurate, polyglycerol-11 myristate, polyglycerol-11 palmitate, polyglycerol-11 stearate, polyglycerol-11 oleate, polyglyceryl-11 cocoate, polyglycerol-12 caprylate, polyglycerol-12 caprate, polyglycerol-12 laurate, polyglycerol-12 myristate, polyglycerol-12 palmitate, polyglycerol-12 stearate, polyglycerol-12 oleate, polyglyceryl-12 cocoate, polyglycerol-14 caprylate, polyglycerol-14 caprate, polyglycerol-14 laurate, polyglycerol-14 myristate, polyglycerol-14 palmitate, polyglycerol-14 stearate, polyglycerol-14 oleate, polyglyceryl-14 cocoate or a mixture thereof; and c) optionally water wherein the surfactant system is suitable for use in an end use composition that has a pH from 4.8 to 6.5, the anionic dicarboxylate and nonionic comprising a polyglycerol ester are at a weight ratio from 5:1 to 1:5 and make up from 80 to 100% by weight total surfactant in the surfactant system and where from 10 to 90% by weight of the surfactant is neutralized, further wherein:

i) each R is independently H or a $C_{1-6}$ alkyl, with the proviso that at least 50% of the R groups on each formula independently are H;

ii) each X is independently $H^+$, $Na^+$, $K^+$, $Ca^+$ or $Mg^+$, with the proviso that each X is not simultaneously $H^+$; and iii) n is 0 or 1, and m is an integer from 6 to 18.

In a third aspect, the present invention is directed to an end use composition that comprises the surfactant system of the first and/or second aspect of the invention, with the proviso when nonionic comprising a polyglycerol ester makes up less than 20% (and preferably less than 18%, and most preferably, 17% or less) by weight of the total weight of surfactant in the surfactant system, the total weight of surfactant present in the composition is at 6% by weight or higher.

In a fourth aspect, the present invention is directed to a method for treating skin with the end use composition of the third aspect of this invention.

In a fifth aspect, the present invention is directed to the use of the composition of the third aspect of the invention at a pH from 4.8 to 6.5 to treat skin.

All other aspects of the present invention will more readily become apparent from the description and examples which follow.

Skin, as used herein, is meant to include skin on the arms (including underarms), face, feet, neck, chest, hands, legs, buttocks and scalp (including hair). The surfactant system of the present invention is typically 80 to 100% by weight anionic dicarboxylate and nonionic comprising at least one polyglycerol ester as described herein. End use compositions will comprise the surfactant system and will also comprise as total surfactant from 80 to 100% by weight anionic dicarboxylate and nonionic comprising polyglycerol ester as herein described based on total weight of surfactant in the end use composition. Such end use compositions can be home care cleaning compositions but are preferably shampoos, make-up washes, facial washes or personal care liquid body washes. The composition (i.e., end use composition) having the surfactant system is ready for topical application and to be wiped or washed off, and preferably, washed off, with water. The composition may, optionally, comprise medicinal or therapeutic agents, but preferably, is a wash which is a cosmetic and non-therapeutic wash. In one embodiment of the invention, the composition can be a home care composition like a table top or toilet cleaning composition. In another embodiment, the composition is a shampoo composition. In still another embodiment, the end use composition is a personal wash composition. In yet another embodiment of the invention, the wash composition of the invention is a baby wash composition, preferably, a hair and/or body wash, and most preferably, a baby body wash. As hereinafter described, the composition of the present invention may optionally comprise skin benefit ingredients added thereto such as emollients, vitamins and/or derivatives thereof, resorcinols, retinoic acid precursors, colorants, moisturizers, sunscreens, mixtures thereof or the like. The skin benefit ingredients (or agents) may be water or oil soluble. If used, oil soluble skin benefit agents typically make up to 2.0% by weight of the end use composition whereby water-soluble skin benefit agents, when used, typically make up to 10% by weight of the end use composition. The end use composition typically has a pH from 4.8 to 6.5. Viscosity, unless noted otherwise, is taken with a Discovery HR-2 Rheometer using sand blasted plates with a 100 micron gap and a shear rate of 4-15 $s^{-1}$ at a temperature of 25° C. Stable, as used herein, means no discoloration, phase separation and visible precipitate seen in the composition after being stored under conditions of atmospheric pressure and for at least one (1) month at 25° C., preferably, from 2 to 4 months at 25° C. As used herein, substantially free of additional surfactant means less than 20% by weight, and preferably, less than 15% by weight, and most preferably, less than 5% by weight additional surfactant, based on total weight of surfactant in the surfactant system and end use composition. In an embodiment of the invention the surfactant system is in a composition that has no additional surfactant (i.e., 0.0%) in addition to the anionic dicarboxylate comprising a glutamate, aspartate or both, and the nonionic comprising at least one polyglycerol ester. As used herein, "do not require" means less than 20% by weight, and preferably, less than 5% by weight, and most preferably, from 0 to 1% by weight of the total weight of surfactant in the surfactant system and end use composition. Glycinates will not make up more than 5 percent by weight of the total weight of surfactant in the surfactant system and end use composition. In an embodiment of the invention, the surfactant system and composition comprise less than 3%, and preferably, less than 2% by weight polyglycosides, betaines, sultaines and sulfates, and preferably, 0.0% by weight of the same. In another embodiment of the invention, the surfactant system and end use composition comprise from 0.001 to 3%, and preferably, from 0.01 to 1.5% by weight glycinate, and most preferably, no glycinate (0.0% by weight) based on total weight of the surfactant in the surfactant system and end use composition. As to the anionic and nonionic surfactants, the combination of the same will have an overall HLB of at least 8, and preferably, at least 12, and most preferably from 13 to 18. The term comprising is meant to encompass the terms consisting essentially of and consisting of. For the avoidance of doubt, and for illustration, the composition of this invention comprising surfactant, water and vitamin is meant to include a composition consisting essentially of the same and a composition consisting of the same. Except in the operating comparative examples, or where otherwise explicitly indicated, all numbers in this description indicating amounts or ratios of materials or conditions and/or physical properties of materials and/or use are to be understood as modified by the word "about".

DETAILED DESCRIPTION OF THE INVENTION

The surfactant system of the present invention comprises an anionic dicarboxylate comprising a glutamate, aspartate or both and a nonionic comprising a polyglycerol ester; and water wherein the surfactant system is suitable for use in an end use composition that has a pH from 4.8 to 6.5, the anionic dicarboxylate and nonionic comprising polyglycerol ester are at a weight ratio from 5:1 to 1:5 and make up from 80 to 100% by weight total surfactant in the surfactant system. It is also within the scope of the present invention for 80 to 100% by weight of the total surfactant used in end use composition to be anionic dicarboxylate and nonionic as herein described. In an embodiment of the invention, the anionic dicarboxylate comprising a glutamate, aspartate or both and a nonionic comprising at least one polyglycerol ester make up from 85 to 100%, and preferably, from 95 to 100% by weight of the total surfactant in the surfactant system (and end use composition), including all ranges subsumed therein. In another embodiment of the invention, the anionic consists essentially of or consists of glutamate and/or aspartate. In still another embodiment of the invention, the nonionic consists essentially of or consists of polyglycerol ester. In even another embodiment of the invention, the anionic is a glutamate and the nonionic is a polyglycerol ester. In a further embodiment of the invention, 100% by weight of all surfactant used in the surfactant system and end use composition is glutamate and/or aspartate and polyglycerol ester. In yet another embodiment of the invention, the surfactant used in the surfactant system and end use composition is 100% by weight glutamate and polyglycerol ester.

In a preferred embodiment of the invention, the anionic dicarboxylate and nonionic are at a weight ratio from 1:4 to 4:1, more preferably, from 1:3 to 3:1, and most preferably, from 1:2 to 2:1. In still another embodiment of the invention, the weight ratio of anionic dicarboxylate to nonionic is from 1:1.5 to 1.5:1, including all weight ratios assumed therein. The pH of the end use composition comprising the surfactant system of the invention is typically from 4.8 to 6.5, preferably, from 5.0 to 6.2, and more preferably, 5.1 to 6.0, and most preferably, from 5.2 to 5.8, including all ranges subsumed therein. The surfactant system of the present invention can be anhydrous (under 1% by weight water) but typically comprises from 1 to 85% by weight water, and preferably, 25 to 80% by weight water, and most preferably, from 30 to 75% by weight water, including all ranges subsumed therein.

The pH of the surfactant system that comprises of the present invention is the same as the ranges identified herein for such end use compositions, and therefore, broadly defined as 4.8 to 6.5, including all ranges subsumed therein. The weight ratio of surfactant in the end use composition that comprises the surfactant system of the present invention is also the same as the weight ratio ranges identified herein for such surfactant systems, and therefore, broadly defined as 1:5 to 5:1, including all ranges subsumed therein.

The end use composition will have from 1 to 40% by weight surfactant. In an embodiment of the invention, the end use composition will have from 1.5 to 30% by weight surfactant. In yet another embodiment, the end use composition will have from 3 to 20% by weight surfactant and in still another embodiment, such composition will have from 4 to 15% by weight surfactant, including all ranges subsumed therein, and with the proviso that when nonionic comprising a polyglycerol ester makes up less than 20% (and preferably less than 18%, and most preferably, 17% or less) by weight of the total weight of surfactant in the surfactant system in the end use composition, the total weight of surfactant present in the composition is at 6% by weight or higher.

As to the surfactants used in this invention, from 10 to 90% by weight of the surfactants are neutralized, preferably, from 25 to 70%, and most preferably, from 45 to 55% by weight of surfactant is neutralized, including all ranges subsumed therein. Neutralization is achieved with bases that provide as counter ions sodium, potassium, calcium, magnesium, ammonium or substituted ammonium.

Illustrative examples of glutamates suitable for use in the present invention include sodium lauroyl glutamate, sodium cocoyl glutamate, potassium lauroyl glutamate, potassium cocoyl glutamate, mixtures thereof or the like. Illustrative examples of aspartates suitable for use either alone or together with glutamates include sodium lauroyl aspartate, potassium lauroyl aspartate, sodium cocoyl aspartate, potassium cocoyl aspartate, mixtures thereof or the like.

As to the nonionic comprising at least one polyglycerol ester, the same typically includes polyglycerol-5 caprylate, polyglycerol-5 caprate, polyglycerol-5 laurate, polyglycerol-5 myristate, polyglycerol-5 palmitate, polyglycerol-5 stearate, polyglycerol-5 oleate, polyglycerol-5 cocoate, polyglyceryl-8 caprylate, polyglycerol-8 caprate, polyglyceryl-8 laurate, polyglyceryl-8 myristate, polyglyceryl-8 palmitate, polyglycerol-8 stearate, polyglycerol-8 oleate, polyglyceryl-8 cocoate, polyglyceryl-9 caprylate, polyglycerol-9 caprate, polyglyceryl-9 laurate, polyglyceryl-9 myristate, polyglyceryl-9 palmitate, polyglycerol-9 stearate, polyglycerol-9 oleate, polyglyceryl-9 cocoate, polyglycerol-10 caprylate, polyglycerol-10 caprate, polyglycerol-10 laurate, polyglycerol-10 myristate, polyglycerol-10 palmitate, polyglycerol-10 stearate, polyglycerol-10 oleate, polyglyceryl-10 cocoate, polyglycerol-11 caprylate, polyglycerol-11 caprate, polyglycerol-11 laurate, polyglycerol-11 myristate, polyglycerol-11 palmitate, polyglycerol-11 stearate, polyglycerol-11 oleate, polyglyceryl-11 cocoate, polyglycerol-12 caprylate, polyglycerol-12 caprate, polyglycerol-12 laurate, polyglycerol-12 myristate, polyglycerol-12 palmitate, polyglycerol-12 stearate, polyglycerol-12 oleate, polyglyceryl-12 cocoate, polyglycerol-14 caprylate, polyglycerol-14 caprate, polyglycerol-14 laurate, polyglycerol-14 myristate, polyglycerol-14 palmitate, polyglycerol-14 stearate, polyglycerol-14 oleate, polyglyceryl-14 cocoate or a mixture thereof.

In an embodiment of the invention, the polyglycerol ester preferably includes polyglyceryl-8 caprylate, polyglycerol-8 caprate, polyglyceryl-8 laurate, polyglyceryl-8 myristate, polyglyceryl-8 palmitate, polyglyceryl-8 stearate, polyglycerol-8 oleate, polyglyceryl-8 cocoate, polyglyceryl-9 caprylate, polyglycerol-9 caprate, polyglyceryl-9 laurate, polyglyceryl-9 myristate, polyglyceryl-9 palmitate, polyglycerol-9 stearate, polyglycerol-9 oleate, polyglyceryl-9 cocoate, polyglyceryl-10 caprylate, polyglycerol-10 caprate, polyglycerol-10 laurate, polyglycerol-10 myristate, polyglycerol-10 palmitate, polyglycerol-10 stearate, polyglycerol-10 oleate, polyglyceryl-10 cocoate, polyglycerol-11 caprylate, polyglycerol-11 caprate, polyglycerol-11 laurate, polyglycerol-11 myristate, polyglycerol-11 palmitate, polyglycerol-11 stearate, polyglycerol-11 oleate, polyglyceryl-11 cocoate, polyglycerol-12 caprylate, polyglycerol-12 caprate, polyglycerol-12 laurate, polyglycerol-12 myristate, polyglycerol-12 palmitate, polyglycerol-12 stearate, polyglycerol-12 oleate, polyglyceryl-12 cocoate or a mixture thereof.

In another embodiment of the invention, the polyglycerol ester used most preferably includes polyglyceryl-8 caprylate, polyglycerol-8 caprate, polyglyceryl-8 laurate, polyglyceryl-8 myristate, polyglyceryl-8 palmitate, polyglyceryl-8 stearate, polyglycerol-8 oleate, polyglyceryl-8 cocoate, polyglycerol-10 caprylate, polyglycerol-10 caprate, polyglycerol-10 laurate, polyglycerol-10 myristate, polyglycerol-10 palmitate, polyglycerol-10 stearate, polyglycerol-10 oleate, polyglyceryl-10 cocoate, polyglycerol-12 caprylate, polyglycerol-12 caprate, poyglycerol-12 laurate, poyglycerol-12 myristate, poyglycerol-12 palmitate, polyglycerol-12 stearate, polyglycerol-12 oleate, polyglyceryl-12 cocoate or a mixture thereof.

In still another embodiment of the invention, the polyglycerol ester used is polyglycerol-10 caprylate, polyglycerol-10 caprate, polyglycerol-10 laurate, polyglycerol-10 myristate, polyglycerol-10 palmitate, polyglycerol-10 stearate, polyglycerol-10 oleate, polyglyceryl-10 cocoate or a mixture thereof.

For the avoidance of doubt, the anionic used in the present invention can be all (100% by weight) glutamate and/or aspartate and the nonionic can be all (100% by weight) polyglycerol ester Even other polyglycerol esters suitable for use include polyglyceryl-4 oleate, polyglycerol polyricinoleate, polyglycerol-6 distearate, polyglycerol-10 dipalmitate.

Glycerol and sorbitan esters may optionally be used with the surfactants of the present invention. An often preferred glycerol ester is glycerol trioleate and often preferred sorbitan esters are sorbitan monolaurate and sorbitan isostearate. When used, these esters typically make up from 0.001 to under 4% (preferably under 3%, and most preferably, under 2%) by weight of the end use composition.

The glutamates, aspartates and polyglycerol esters suitable for use in the present invention are available from suppliers like Stepan Company, Clariant AG, Croda, Galaxy Surfactants, Sino Lion, Lonza, Innospec and Dow Chemical.

As to optional surfactants (i.e., surfactants that make up less than 20% by weight of the total weight of surfactant in the surfactant system and end use composition as defined herein) that may be used with the surfactant system and composition of this invention, the same include anionic surfactants which can be aliphatic sulfonates, such as a primary alkane (e.g., $C_8$-$C_{22}$) sulfonate, primary alkane (e.g., $C_8$-$C_{22}$) disulfonate, $C_8$-$C_{22}$ alkene sulfonate, $C_8$-$C_{22}$ hydroxyalkane sulfonate or alkyl glyceryl ether sulfonate (AGS); or aromatic sulfonates such as alkyl benzene sulfonate. The anionic may also be an alkyl sulfate (e.g., $C_8$-$C_{18}$ alkyl sulfate) or alkyl ether sulfate (including alkyl glyceryl ether sulfates). Among the alkyl ether sulfates are those having the formula:

$RO(CH_2CH_2O)_nSO_3M$ wherein R is an alkyl or alkenyl having 8 to 18 carbons, preferably 12 to 18 carbons, n has an average value of at least 1.0, preferably less than 5, and most preferably 1 to 4, and M is a solubilizing cation such as sodium, potassium, ammonium or substituted ammonium.

The anionic may also include alkyl sulfosuccinates (including mono- and dialkyl, e.g., $C_6$-$C_{22}$ sulfosuccinates); alkyl and acyl taurates (often methyl taurates), alkyl and acyl sarcosinates, sulfoacetates, $C_8$-$C_{22}$ alkyl phosphates and phosphonates, alkyl phosphate esters and alkoxyl alkyl phosphate esters, acyl lactates, $C_8$-$C_{22}$ monoalkyl succinates and maleates, sulphoacetates, alkyl glucosides and acyl isethionates, and the like.

Sulfosuccinates may be monoalkyl sulfosuccinates having the formula:

$R^1OC(O)CH_2CH(SO_3M)CO_2M$;

and amide-MEA sulfosuccinates of the formula:

$R^1CONHCH_2CH_2OC(O)CH_2CH(SO_3M)CO_2M$
wherein $R^1$ ranges from $C_8$-$C_{22}$ alkyl.

Sarcosinates are generally indicated by the formula:

$R^2CON(CH_3)CH_2CO_2M$, wherein $R^2$ ranges from $C_8$-$C_{20}$ alkyl.

Taurates are generally identified by formula:

$R^3CONR^4CH_2CH_2SO_3M$ wherein $R^3$ is a $C_8$-$C_{20}$ alkyl, $R^4$ is a $C_1$-$C_4$ alkyl.
M is a solubilizing cation as previously described.

Other optional surfactants that may be used include $C_8$-$C_{18}$ acyl isethionates. These esters are prepared by a reaction between alkali metal isethionate with mixed aliphatic fatty acids having from 6 to 18 carbon atoms and an iodine value of less than 20. At least 75% of the mixed fatty acids have from 12 to 18 carbon atoms and up to 25% have from 6 to 10 carbon atoms.

The acyl isethionate may be an alkoxylated isethionate such as is described in Ilardi et al., U.S. Pat. No. 5,393,466, entitled "Fatty Acid Esters of Polyalkoxylated isethionic acid; issued Feb. 28, 1995; hereby incorporated by reference. This compound has the general formula:

$R^5C(O)O-C(X)H-CH_2-(OC(Y)H-CH_2)_m-SO_3M$ wherein $R^5$ is an alkyl group having 8 to 18 carbons, m is an integer from 1 to 4, X and Y are each independently hydrogen or an alkyl group having 1 to 4 carbons and M is a solubilizing cation as previously described.

In an embodiment of the invention, the anionic surfactant can optionally include sodium lauroyl isethionate, sodium cocoyl isethionate, sodium methyl lauroyl taurate, sodium methyl cocoyl taurate or a mixture thereof. Such anionic surfactants are commercially available from suppliers like Galaxy Surfactants, Clariant, Sino Lion and Innospec.

Amphoteric surfactants suitable for optional use in the invention (which depending on pH can be zwitterionic) include sodium acyl amphoacetates, sodium acyl amphopropionates, disodium acyl amphodiacetates and disodium acyl amphodipropionates where the acyl (i.e., alkanoyl group) can comprise a $C_7$-$C_{18}$ alkyl portion. Illustrative examples of the amphoteric surfactants suitable for use include sodium lauroamphoacetate, sodium cocoamphoacetate, sodium lauroamphoacetate, sodium cocoamphoacetate and mixtures thereof.

As to the zwitterionic surfactants that may optionally be used in the present invention, such surfactants include at least one acid group. Such an acid group may be a carboxylic or a sulphonic acid group. They often include quaternary nitrogen, and therefore, can be quaternary amino acids. They should generally include an alkyl or alkenyl group of 7 to 18 carbon atoms generally comply with an overall structural formula: $R^6-[-C(O)-NH(CH_2)_q-]_r-N^+(R^7)(R^8)A-B$ where $R^6$ is alkyl or alkenyl of 7 to 18 carbon atoms; $R^7$ and $R^8$ are each independently alkyl, hydroxyalkyl or carboxyalkyl of 1 to 3 carbon atoms; q is 2 to 4; r is 0 to 1; A is alkylene of 1 to 3 carbon atoms optionally substituted with hydroxyl, and B is $-CO_2-$ or $-SO_3-$.

Suitable zwitterionic surfactants for use in the present invention and within the above general formula include simple betaines of formula:

$R^6-N^+(R^7)(R^8)-CH_2CO_2^-$ and amido betaines of formula:

$R^6-CONH(CH_2)_t-N^+-(R^7)(R^8)CH_2CO_2^-$ where t is 2 or 3.

In both formulae $R^6$, $R^7$ and $R^8$ are as defined previously. $R^6$ may, in particular, be a mixture of $C_{12}$ and $C_{14}$ alkyl groups derived from coconut oil so that at least half, preferably at least three quarters of the groups $R^6$ have 10 to 14 carbon atoms. $R^7$ and $R^8$ are preferably methyl.

A further possibility is that the zwitterionic surfactant is a sulphobetaine of formula:

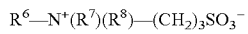

or

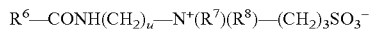

where u is 2 or 3, or variants of these in which $-(CH_2)_3SO_3^-$ is replaced by $-CH_2C(OH)(H)CH_2SO_3^-$.

In these formulae, $R^6$, $R^7$ and $R^8$ are as previously defined.

Illustrative examples of the zwitterionic surfactants suitable for optional use include betaines like cocodimethyl carboxymethyl betaine, cocoamidopropyl betaine and laurylamidopropyl betaine. An additional zwitterionic surfactant suitable for use includes cocoamidopropyl sultaine. Such surfactants are made commercially available from suppliers like Stepan Company, and it is within the scope of the invention to optionally employ mixtures of the aforementioned surfactants.

Additional nonionic surfactants that may optionally be used include in particular the reaction products of compounds having a hydrophobic group and a reactive hydrogen atom, for example aliphatic alcohols, acids, amides or alkylphenols with alkylene oxides, especially ethylene oxide either alone or with propylene oxide. Specific nonionic surfactant compounds are alkyl ($C_6$-$C_{22}$) phenols ethylene oxide condensates, the condensation products of aliphatic ($C_8$-$C_{18}$) primary or secondary linear or branched alcohols with ethylene oxide, and products made by condensation of ethylene oxide with the reaction products of propylene oxide and ethylenediamine. Other nonionic surfactants include long chain tertiary amine oxides, long chain tertiary phosphine oxides, dialkyl sulphoxides, and the like.

In an embodiment of the invention optional nonionic surfactants include fatty acid/alcohol ethoxylates having the following structures a) $HOCH_2(CH_2)_s(CH_2CH_2O)_v H$ or b) $HOOC(CH_2)_c(CH_2CH_2O)_d H$; where s and v are each independently an integer up to 18; and c and d are each independently an integer from 1 or greater. In an embodiment of the invention, s and v are each independently 6 to 18; c and d are each independently 1 to 30. Other options for nonionic surfactants include those having the formula $HOOC(CH_2)_i-CH=CH-(CH_2)_k(CH_2CH_2O)_z H$, where i, k are each independently 5 to 15; and z is 5 to 50. In another embodiment of the invention, i and k are each independently 6 to 12; and z is 15 to 35.

The optional nonionic may also include a sugar amide, such as a polysaccharide amide. Specifically, the surfactant may be one of the lactobionamides described in U.S. Pat. No. 5,389,279 to Au et al., entitled "Compositions Comprising Nonionic Glycolipid Surfactants issued Feb. 14, 1995; which is hereby incorporated by reference or it may be one of the sugar amides described in U.S. Pat. No. 5,009,814 to Kelkenberg, titled "Use of N-Poly Hydroxyalkyl Fatty Acid Amides as Thickening Agents for Liquid Aqueous Surfactant Systems" issued Apr. 23, 1991; hereby incorporated into the subject application by reference.

Yet other optional nonionic surfactants that may be used in the surfactant system and the end use composition of the present invention include nonionic glucamides like lauroyl methyl glucamide, myristoyl methyl glucamide, cocoyl methyl glucamide, capryloyl/caproyl methyl glucamide, sunfloweroyl methyl glucamide mixtures thereof or the like. When used, glucamides will make up no more than 18% by weight, and preferably, from 0.001 to 15%, and most preferably, from 0.01 to 10% by weight of total the total surfactant in the surfactant system and end use composition, including all ranges subsumed therein.

In still another embodiment of the invention, cationic surfactants may optionally be used.

One class of cationic surfactants includes heterocyclic ammonium salts such as cetyl or stearyl pyridinium chloride, alkyl amidoethyl pyrrylinodium methyl sulfate, and lapyrium chloride.

Tetra alkyl ammonium salts are another useful class of cationic surfactants suitable for use. Examples include cetyl or stearyl trimethyl ammonium chloride or bromide; hydrogenated palm or tallow trimethylammonium halides; behenyl trimethyl ammonium halides or methyl sulfates; decyl isononyl dimethyl ammonium halides; ditallow (or distearyl) dimethyl ammonium halides, and behenyl dimethyl ammonium chloride.

Still other types of cationic surfactants that may be used are the various ethoxylated quaternary amines and ester quats. Examples include PEG-5 stearyl ammonium lactate (e.g., Genamin KSL manufactured by Clariant), PEG-2 coco ammonium chloride, PEG-15 hydrogenated tallow ammonium chloride, PEG 15 stearyl ammonium chloride, dipalmitoyl ethyl methyl ammonium chloride, dipalmitoyl hydroxyethyl methyl sulfate, and strearyl amidopropyl dimethylamine lactate.

Even other useful cationic surfactants suitable for use include quatemized hydrolysates of silk, wheat, and keratin proteins, and it is within the scope of the invention to use mixtures of the aforementioned cationic surfactants.

If optionally used, cationic surfactants will make up no more than 1.0% by weight of the end use composition. When present, they typically make up from 0.01 to 0.7%, and more typically, from 0.1 to 0.5% by weight of the end us composition, including all ranges subsumed therein. Regarding all other optional surfactants, these preferably make up less than 12%, more preferably, less than 6%, and most preferably, less than 3% by weight of the total weight of all surfactant in the in the surfactant system and end use composition. In an embodiment of the invention, the surfactant system and end use composition comprising the same are free of optional surfactant. Therefore, and in still another embodiment, the surfactants in the surfactant system and end use composition are 98% or more, and preferably, 99% or more by weight anionic dicarboxylate which is a glutamate and/or aspartate and a nonionic which is a polyglycerol ester. In an embodiment of the invention, the end use composition of the present invention is from 45 to 90% by weight water, preferably, from 50 to 85%, and most preferably, from 60 to 80% by weight water, including all ranges subsumed therein.

Adjusters suitable to modify/buffer pH may be used. Such pH adjusters include triethylamine, NaOH, KOH, $H_2SO_4$, HCl, $C_6H_8O_7$ (i.e., citric acid) or mixtures thereof. The pH adjusters are added at amounts such that the resulting pH of the surfactant system and composition are as defined and desired, from 4.8 to 6.5. The pH values may be assessed with commercial instrumentation such as a pH meter made commercially available from Thermo Scientific®. Opacifiers like titanium dioxide may also optionally be used. When used, opacifiers make up from 0.01 to 3% by weight of the end use composition.

Optional skin benefit agents suitable for use in this invention are limited only to the extent that they are capable of being topically applied, and suitable to dissolve in the surfactant system and composition at the defined pH.

Illustrative examples of the benefit agents suitable to include in the water portion of the surfactant system and composition are acids, like amino acids, such as arginine, valine or histidine. Additional water soluble benefit agents suitable for use include vitamin $B_2$ niacinamide (vitamin $B_3$), vitamin $B_6$, vitamin C, mixtures thereof or the like. Water soluble derivatives of such vitamins may also be employed. For instance, vitamin C derivatives such as ascorbyl tetraisopalmitate, magnesium ascorbyl phosphate and ascorbyl glycoside may be used alone or in combination with each other. Other water soluble benefit agents suitable for use include 4-ethyl resorcinol, extracts like sage, aloe vera, green tea, grapeseed, thyme, chamomile, yarrow, cucumber, liquorice, rosemary extract or mixtures thereof. Water soluble sunscreens like ensulizole may also be used. Total amount of optional water soluble benefit agents (including mixtures) when present in the invention may range from 0.0 to 10%, preferably from 0.001 to 8%, and most preferably, from 0.01 to 6% by weight, based on total weight of the end use composition and including all ranges subsumed therein.

It is also within the scope of the present invention to optionally include oil (i.e., non-water) soluble benefit agents. The only limitation with respect to such oil soluble benefit agents are that the same are suitable to provide a benefit to skin when topically applied.

Illustrative examples of the types of oil soluble benefit agents that may optionally be used in the end use composition of this invention include components like stearic acid, vitamins like Vitamin A, D, E and K (and their oil soluble derivatives), sunscreens like ethylhexylmethoxycinnamate, bis-ethyl hexyioxyphenol methoxyphenol triazine, 2-ethylhexyl-2-cyano-3,3-diphenyl-2-propanoic acid, drometrizole trisiloxane, 3,3,5-trimethyl cyclohexyl 2-hydroxybenzoate, 2-ethylhexyl-2-hydroxybenzoate or mixtures thereof. Other optional oil soluble benefit agents suitable for use include resorcinols like 4-hexyl resorcinol, 4-phenylethyl resorcinol, 4-cyckopentyl resorcinol, 4-cyclohexyl resorcinol 4-isopropyl resorcinol or a mixture thereof. Also, 5-substituted resorcinols like 4-cyclohexyl-5-methylbenzene-1,3-diol, 4-isopropyl-5-methylbenzene-1,3-diol, mixtures thereof or the like may be used. The 5-substituted resorcinois, and their synthesis are described in commonly assigned U.S. Published Patent Application No. 2016/0000669A1. Even other oil soluble actives suitable for use include omega-3 fatty acids, omega-6 fatty acids, climbazole, farnesol, ursolic acid, myristic acid, geranyl geraniol, oleyl betaine, cocoyl hydroxyethyl imidazoline, hexanoyl sphingosine, 12-hydroxystearic acid, petroselinic acid, conjugated linoleic acid, terpineol, thymol mixtures thereof or the like. In an embodiment of the invention, the optional oil soluble benefit agent used is a retinoic acid precursor. In one embodiment of the invention, the retinoic acid precursor is retinol, retinal, retinyl propionate, retinyl palmitate, retinyl acetate or a mixture thereof. Retinyl propionate, retinyl palmitate and mixtures thereof are typically preferred.

Still another retinoic acid precursor suitable for use is hydroxyanasatil retinoate made commercially available under the name Retextra® as supplied by Molecular Design International. The same may be used in a mixture with the oil soluble actives described herein. When optional (i.e., 0.0 to 2% by weight) oil soluble active is used in the non-water phase of the surfactant system and composition of the invention, it typically makes up from 0.001 to 1.5%, and in another embodiment, from 0.05 to 1.2%, and in yet another embodiment, from 0.1 to 0.5% by weight of the total weight of the end use composition, including all ranges subsumed therein.

Preservatives can desirably be incorporated into the surfactant system and end use composition to protect against the growth of potentially harmful microorganisms. Cosmetic chemists are familiar with appropriate preservatives and routinely choose them to satisfy the preservative challenge test and to provide product stability. Suitable traditional preservatives for use include hydantoin derivatives and propionate salts. Particularly preferred preservatives are iodopropynyl butyl carbamate, phenoxyethanol, 1,2-octanediol, hydroxyacetophenone, ethylhexylglycerine, hexylene glycol, methyl paraben, propyl paraben, imidazolidinyl urea, sodium dehydroacetate, dimethyl-dimethyl (DMDM) hydantoin, benzyl alcohol, methylisothiazolinone, caprylyl glycol, sodium benzoate or mixtures thereof. Other preservatives suitable for use include sodium dehydroacetate, chlorophenesin and decylene glycol. The preservatives should be selected having regard for the use of the composition and possible incompatibilities between the preservatives and other ingredients in the emulsion. Preservatives are preferably employed in amounts ranging from 0.01% to 2% by weight of the total weight of the end use composition, including all ranges subsumed therein. Also preferred is a preservative system with hydroxyacetophenone alone or in a mixture with other preservatives.

Thickening agents (or viscosity builders) are optionally suitable for use in the surfactant systems and end use compositions of the present invention. The preferred thickening agents can be naturally derived or synthetic, are suitable for use in compositions having a pH from 4.8 to 6.5, and are suitable for use in compositions having excellent foaming/lathering qualities. Examples include hydroxypropyl starch phosphate, rheology modifying fatty acids, starches, as well as natural or chemically modified polysaccharides. Polysaccharides suitable for use include celluloses; microcrystalline celluloses; hemicelluloses; cellulose gums; pectins, like homogalacturonan, xylogalacturonan, rhamnogalacturonan; exudate polysaccharide gums, like gum arabic, gum tragacanth, acacia gum, karaya gum, ghatti gum; extractive polysaccharide gums, like Konjac gum, guar gum, locust bean gum, mustard mucilage gum, flaxseed mucilage gum, okra mucilage gum, *psyllium* gum; seaweed polysaccharides, like carrageenan, agar, or alginate; microbial polysaccharides, like xanthan gum, gellan gum, or pullulan gum; fermentation polysaccharides, like *sclerotium* gums; fructans, like inulin or levan; or mixtures of thereof. Other thickening agents suitable for use include acids like capric, lauric, stearic, myristic, or palmitic acid or mixtures thereof. Typical amounts may range from 0.0 to 12%, and often, from 0.0 to 8%, and preferably, 0.001 to 6%, and most preferably, from 0.01 to 5% by weight of the end use composition. In an embodiment of the invention, thickening agent can make up from 0.02 to 1% by weight of the end use composition, including all ranges subsumed therein.

Fragrances, fixatives, chelators (like EDTA) salts (like NaCl) and exfoliants may optionally be included in the end use composition of the present invention. Each of these substances may range from about 0.03 to about 5%, preferably between 0.1 and 3% by weight of the end use composition, including all ranges subsumed therein. To the extent the exfoliants are used, those selected should be of small enough particle size so that they do not impede the performance of end use composition or any packaging it is dispensed from.

Conventional emulsifiers having an HLB of greater than 8 may optional be used. Illustrative examples include Tween, 40, 60, 80, polysorbate 20 and mixtures thereof.

Typically emulsifiers for water continuous systems, when used, make up from 0.3 to 2.5% by weight of the end use composition.

Conventional humectants may optionally be employed as additives in the present invention to assist in moisturizing skin when such emulsions are topically applied. These are generally polyhydric alcohol type materials. Typical polyhydric alcohols include glycerol (i.e., glycerine or glycerin), propylene glycol, dipropylene glycol, polypropylene glycol (e.g., PPG-9), polyethylene glycol, sorbitol, hydroxypropyl sorbitol, hexylene glycol, 1,3-butylene glycol, isoprene glycol, 1,2,6-hexanetriol, ethoxylated glycerol, propoxylated glycerol and mixtures thereof. Most preferred is glycerin, propylene glycol or a mixture thereof. The amount of humectant employed may range anywhere from 0.0 to 35% by weight of the total weight of the liquid and composition. Often, humectant makes up from 0.0 to 20%, and preferably, from 0.001 to 15% by weight (most preferably, from 2 to 12% by weight) of the total weight of the end use composition.

When making the end use compositions of this invention, the desired ingredients may be mixed with conventional apparatus under moderate shear atmospheric conditions, with temperature being from 25° C. to 90° C. Such end use compositions will typically have a viscosity from 1.0 to 25,000 cps, and preferably, from 500 to 20,000 cps, and most preferably, from 900 to 10,000 cps, including all ranges subsumed therein. In an embodiment of the invention, the viscosity of the end use composition is from 1,250 to 9,500, including all ranges subsumed therein.

The packaging for the end use composition of this invention can be a pump dispenser, tube, jar or plastic bottle. Preferably, the package is a bottle which is made with recyclable materials and/or post consumer resins.

The following examples are provided to facilitate an understanding of the present invention. They are not intended to limit the scope of the claims.

EXAMPLE

The formula below represents the base formula to which the surfactant systems as defined in the Table were added. The resulting formulae were prepared by mixing the ingredients with moderate shear and at a temperature from about 35-45° C. Water was added to balance.

A mixing vessel was charged with (all percents by weight) 2.8% of a xanthan gum and microcrystalline cellulose blend (mixture about 30% xanthan), 0.05% chelator (EDTA), and 2.0% glycerin. The ingredients were mixed under high shear conditions and homogenized at ambient temperature, approximately 20-26° C. The resulting homogeneous mixture was then heated to about 85° C. upon which 0.31% stearic acid and 0.25% lauric acid and anionic and nonionic surfactants as identified in the Table below were added and mixed until dissolved. The resulting mixture was cooled to about 25° C. and subsequently charged with 0.55% preservative. Composition pH was adjusted with about 0.5% citric acid to yield compositions having a pH consistent with the pH values identified in the Table. The pH was measured with a Thermo Scientific Orion Star A211 Benchtop pH meter. The resulting baby wash compositions were subject to stability test at ambient temperature (25° C.) and atmospheric pressure for 1 month. Satisfactory stability was determined by assessing the compositions for the absence of visual phase separation. The assessment was carried out by smearing the mixtures on a smooth, clean surface and observing for graininess, crystals, precipitates and phase separation. Also, trained panelists rubbed and smeared the wash compositions between their thumbs and index fingers for 15 seconds to feel for graininess and solid particulate. To the extent any separation and/or particulate was observed, the wash composition was deemed not stable (i.e., a fail).

The panelist also washed their hands with the baby wash compositions of this Example, and concluded that all formulae made consistent with the present invention foamed significantly better than those not made according to the invention.

| Sodium Lauroyl Glutamate (% wt) | Lauroyl Methyl Glucamide (% wt) | Polyglyceryl Stearate (% wt) | Polyglyceryl Caprylate/ Caprate (50/50) (% wt) | Polyglyceryl Laurate (% wt) | Polyglyceryl Oleate (% wt) | Polyglyceryl Cocoate (% wt) | pH | Stable |
|---|---|---|---|---|---|---|---|---|
| 0.74 | — | — | 6.62 | — | — | — | 5.47 | Yes |
| 0.74 | — | 0.74 | 5.88 | — | — | — | 5.49 | Yes |
| 0.46 | — | 0.00 | 4.10 | — | — | — | 5.52 | Yes |
| 0.65 | — | 4.05 | 1.80 | — | — | — | 5.25 | Yes |
| 0.60 | — | 0.60 | 4.76 | — | — | — | 5.43 | Yes |
| 0.46 | — | 0.46 | 3.64 | — | — | — | 5.42 | Yes |
| 0.60 | — | — | 5.36 | — | — | — | 5.43 | Yes |
| 1.12 | — | 0.32 | 3.11 | — | — | — | 5.47 | Yes |
| 1.33 | — | — | 3.22 | — | — | — | 5.50 | Yes |
| 1.49 | — | 0.14 | 2.92 | — | — | — | 5.57 | Yes |
| 2.9 | 3.00 | — | 2.90 | — | — | — | 5.47 | Yes |
| 1.55 | — | 0.00 | 3.00 | — | — | — | 5.58 | Yes |
| 1.94 | — | 0.46 | 2.16 | — | — | — | 5.54 | Yes |
| 2.9 | 3 | — | 0.6 | — | — | — | 5.47 | Yes |
| 2.9 | 2.4 | 1.2 | — | — | — | — | 5.43 | Yes |
| 2.05 | — | 0.46 | 2.05 | — | — | — | 5.58 | Yes |
| 3.50 | — | 0.36 | 3.50 | — | — | — | 5.60 | Yes |
| 2.18 | — | 0.18 | 2.18 | — | — | — | 5.55 | Yes |
| 3.25 | — | — | — | — | — | 3.25 | 5.49 | Yes |
| 3.3 | — | — | — | 3.2 | — | — | 5.45 | Yes |
| 3.3 | — | — | — | — | 3.2 | — | 5.49 | Yes |
| 2.64 | — | 0.00 | 1.91 | — | — | — | 5.58 | Yes |
| 2.78 | — | 0.32 | 1.45 | — | — | — | 5.50 | Yes |
| 2.91 | — | 0.14 | 1.51 | — | — | — | 5.59 | Yes |
| 3.00 | — | 0.00 | 1.55 | — | — | — | 5.58 | Yes |
| 5.88 | — | 0.74 | 0.74 | — | — | — | 5.58 | Yes |

-continued

| Sodium Lauroyl Glutamate (% wt) | Lauroyl Methyl Glucamide (% wt) | Polyglyceryl Stearate (% wt) | Polyglyceryl Caprylate/ Caprate (50/50) (% wt) | Polyglyceryl Laurate (% wt) | Polyglyceryl Oleate (% wt) | Polyglyceryl Cocoate (% wt) | pH | Stable |
|---|---|---|---|---|---|---|---|---|
| 4.76 | — | 0.60 | 0.60 | — | — | — | 5.61 | No |
| 3.64 | — | 0.46 | 0.46 | — | — | — | 5.60 | No |
| 3.78 | — | 0.32 | 0.46 | — | — | — | 5.59 | No |
| 3.97 | — | 0.13 | 0.46 | — | — | — | 5.61 | No |
| 6.62 | — | 0.00 | 0.74 | — | — | — | 5.62 | No |
| 5.36 | — | 0.00 | 0.60 | — | — | — | 5.61 | No |
| 4.10 | — | 0.00 | 0.46 | — | — | — | 5.61 | No |

What is claimed is:

1. A surfactant system comprising:
   a) an anionic dicarboxylate comprising a glutamate, aspartate or both;
   b) a nonionic comprising a polyglycerol ester; and
   c) water
   wherein the surfactant system is suitable for use in wash composition that has a pH from 4.8 to 6.5, the anionic dicarboxylate and nonionic comprising a polyglycerol ester are at a weight ratio from 5:1 to 1:5 and make up from 5 to 100% by weight total surfactant in the surfactant system, and further wherein the surfactant system comprises no sulfate comprising surfactant.

2. The surfactant system according to claim 1 wherein the anionic dicarboxylate comprising a glutamate, aspartate or both has the formula:

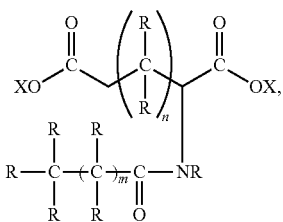

and the nonionic comprising a polyglycerol ester comprises a polyglycerol ester comprises polyglycerol-5 caprylate, polyglycerol-5 caprate, polyglycerol-5 laurate, polyglycerol-5 myristate, polyglycerol-5 palmitate, polyglycerol-5 stearate, polyglycerol-5 oleate, polyglycerol-5 cocoate, polyglyceryl-8 caprylate, polyglycerol-8 caprate, polyglyceryl-8 laurate, polyglyceryl-8 myristate, polyglyceryl-8 palmitate, polyglycerol-8 stearate, polyglycerol-8 oleate, polyglyceryl-8 cocoate, polyglyceryl-9 caprylate, polyglycerol-9 caprate, polyglyceryl-9 laurate, polyglyceryl-9 myristate, polyglyceryl-9 palmitate, polyglycerol-9 stearate, polyglycerol-9 oleate, polyglyceryl-9 cocoate, polyglycerol-10 caprylate, polyglycerol-10 caprate, polyglycerol-10 laurate, polyglycerol-10 myristate, polyglycerol-10 palmitate, polyglycerol-10 stearate, polyglycerol-10 oleate, polyglyceryl-10 cocoate, polyglycerol-11 caprylate, polyglycerol-11 caprate, polyglycerol-11 laurate, polyglycerol-11 myristate, polyglycerol-11 palmitate, polyglycerol-11 stearate, polyglycerol-11 oleate, polyglyceryl-11 cocoate, polyglycerol-12 caprylate, polyglycerol-12 caprate, polyglycerol-12 laurate, polyglycerol-12 myristate, polyglycerol-12 palmitate, polyglycerol-12 stearate, polyglycerol-12 oleate, polyglyceryl-12 cocoate, polyglycerol-14 caprylate, polyglycerol-14 caprate, polyglycerol-14 laurate, polyglycerol-14 myristate, polyglycerol-14 palmitate, polyglycerol-14 stearate, polyglycerol-14 oleate, polyglyceryl-14 cocoate or a mixture thereof
wherein from 10 to 90% by weight of surfactant in the system is neutralized, further wherein:
   i) each R is independently H or a $C_{1-6}$ alkyl, with the proviso that at least 50% of the R groups on each formula independently are H;
   ii) each X is independently $H^+$, $Na^+$, $K^+$, $Cat$ or $Mg^+$, with the proviso that each X is not simultaneously $H^+$;
   iii) n is 0 or 1, and m is an integer from 6 to 18; and
   iv) the surfactant system has a pH from 4.8 to 6.5.

3. A wash composition with a surfactant system comprising:
   a) an anionic dicarboxylate comprising a glutamate, aspartate or both;
   b) a nonionic comprising a polyglycerol ester; and
   c) water
   wherein the wash composition has a pH from 4.8 to 6.5, the anionic dicarboxylate and nonionic comprising a polyglycerol ester are at a weight ratio from 5:1 to 1:5 and make up from 805 to 100% by weight total surfactant in the wash composition and the wash composition comprises no sulfate comprising surfactant, with the proviso that when nonionic comprising a polyglycerol ester makes up less than 17% by weight of the total weight of surfactant in the surfactant system, the total weight of surfactant present in the composition is at 6% by weight or higher.

4. The wash composition according to claim 3 wherein the anionic dicarboxylate comprising a glutamate, aspartate or both has the formula:

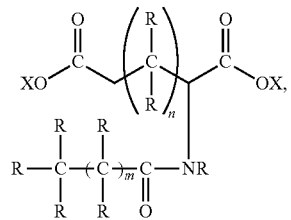

and
and the nonionic comprising polyglycerol-3 caprylate, polyglycerol-3 caprate, polyglycerol-3 laurate, polyglycerol-3 myristate, polyglycerol-3 palmitate, polyglycerol-3 stearate, polyglycerol-3 oleate, polyglycerol-3 cocoate, a polyglycerol ester comprises polyglycerol-5 caprylate, polyglycerol-5 caprate, polyglycerol-5 laurate, polyglycerol-5 myristate, polyglycerol-5 palmitate, polyglycerol-5 stearate, polyglycerol-5 oleate, polyglycerol-5 cocoate, polyglyceryl-8 caprylate, polyglycerol-8 caprate, polyglyceryl-8 laurate, polyglyceryl-8 myristate, polyglyceryl-8 palmitate, polyglycerol-8 stearate, polyglyceryl-8 oleate, polyglyceryl-8 cocoate, polyglyceryl-9 caprylate, polyglycerol-9 caprate, polyglyceryl-9 laurate, polyglyceryl-9 myristate, polyglyceryl-9 palmitate, polyglycerol-9 stearate, polyglycerol-9 oleate, polyglyceryl-9 cocoate, polyglycerol-10 caprylate, polyglycerol-10 caprate, polyglycerol-10 laurate, polyglycerol-10 myristate, polyglycerol-10 palmitate, polyglycerol-10 stearate, polyglycerol-10 oleate, polyglyceryl-10 cocoate, polyglycerol-11 caprylate, polyglycerol-11 caprate, polyglycerol-11 laurate, polyglycerol-11 myristate, polyglycerol-11 palmitate, polyglycerol-11 stearate, polyglycerol-11 oleate, polyglyceryl-11 cocoate, polyglycerol-12 caprylate, polyglycerol-12 caprate, polyglycerol-12 laurate, polyglycerol-12 myristate, polyglycerol-12 palmitate, polyglycerol-12 stearate, polyglycerol-12 oleate, polyglyceryl-12 cocoate, polyglycerol-14 caprylate, polyglycerol-14 caprate, polyglycerol-14 laurate, polyglycerol-14 myristate, polyglycerol-14 palmitate, polyglycerol-14 stearate, polyglycerol-14 oleate, polyglyceryl-14 cocoate or a mixture thereof wherein from 10 to 90% by weight of surfactant in the system is neutralized, further wherein:

i) each R is independently H or a $C_{1-6}$ alkyl, with the proviso that at least 50% of the R groups on each formula independently are H;

ii) each X is independently H$^+$, Na$^+$, K$^+$, Cat or Mg$^+$, with the proviso that each X is not simultaneously H$^+$; and iii) n is 0 or 1, and m is an integer from 6 to 18.

5. The wash composition according to claim 3 wherein the wash composition is a hair wash, body wash or a hair and body wash composition.

6. The wash composition according to claim 4 wherein the wash composition is a baby wash composition that is transparent, translucent or opacified with an opacifier.

7. The wash composition according to claim 3 wherein total surfactant in the wash composition is 985 to 100% by weight anionic dicarboxylate comprising glutamate, aspartate or both and nonionic comprising polyglycerol ester.

8. The wash composition according to claim 3 wherein the wash composition further comprises a rheology modifier and less than 2% by weight of a betaine and sultaine.

9. The wash composition according to claim 3 wherein total surfactant comprises less than 5% by weight glycinate and the wash composition further comprises rheology modifier comprising starch, gum, fatty acid or a mixture thereof.

10. The wash composition according to claim 3 wherein the composition has a viscosity from 1 to 25,000 cps.

11. The wash composition according to claim 3 wherein the pH of the wash composition is from 5 to 6.2.

12. The wash composition according to claim 3 wherein the composition comprises from 45 to 95% by weight water and anionic dicarboxylate to nonionic comprising polyglycerol ester are at a weight ratio from 1:4 to 4:1.

13. The wash composition according to claim 3 wherein the composition comprises from 50 to 85% by weight water and anionic dicarboxylate to nonionic comprising polyglycerol ester are at a weight ratio 1:1.5 to 1.5:1.

14. The wash composition according to claim 3 wherein the anionic dejcarboxylate is sodium lauroyl glutamate, sodium cocoyl glutamate, potassium lauroyl glutamate, potassium cocoyl glutamate, sodium lauroyl aspartate, potassium lauroyl aspartate, sodium cocoyl aspartate, potassium cocoyl aspartate, or a mixture thereof and the nonionic comprising polyglycerol ester is polyglycerol-10 caprylate, polyglycerol-10 caprate, polyglycerol-10 laurate, polyglycerol-10 myristate, polyglycerol-10 palmitate, polyglycerol-10 and the surfactant system has an HLB of 8 or greater.

15. A method of preparing wash composition comprising the steps of combining, in no particular order:

a) an anionic dicarboxylate (surfactant) comprising a glutamate, aspartate or both;

b) a nonionic comprising a polyglycerol ester (surfactant);

c) water; and d) recovering the wash composition wherein the end use composition has a pH from 4.8 to 6.5, the anionic dicarboxylate and nonionic comprising a polyglycerol ester are at a weight ratio from 5:1 to 1:5 and make up from 80 to 100% by weight total surfactant in the surfactant system.

16. The wash composition according to claim 3 wherein the wash composition further comprises 4-ethyl resorcinol, 4-hexyl resorcinol, 12-hydroxystearic acid, retinyl propionate, niacinamide or a mixture thereof.

17. The wash composition according to claim 3 wherein the wash composition further comprises 4-hexyl resorcinol, retinyl propionate and niacinamide.

18. The wash composition according to claim 3 wherein the wash composition further comprises vitamin C, rosemary extract, citric acid or a mixture thereof.

19. The wash composition according to claim 3 wherein the wash composition further comprises palmitic acid, 12-hydroxystearic acid and glycerol.

* * * * *